June 1, 1965   C. L. WHITEFORD   3,186,576
METHOD OF MAKING A DIE CUT EDGE OF THERMOPLASTIC
ARTICLES TEAR RESISTANT
Filed May 12, 1960   2 Sheets-Sheet 1

INVENTOR.
CARLTON L. WHITEFORD
BY *William S. Henry*
ATTORNEY.

June 1, 1965  C. L. WHITEFORD  3,186,576
METHOD OF MAKING A DIE CUT EDGE OF THERMOPLASTIC
ARTICLES TEAR RESISTANT
Filed May 12, 1960  2 Sheets-Sheet 2
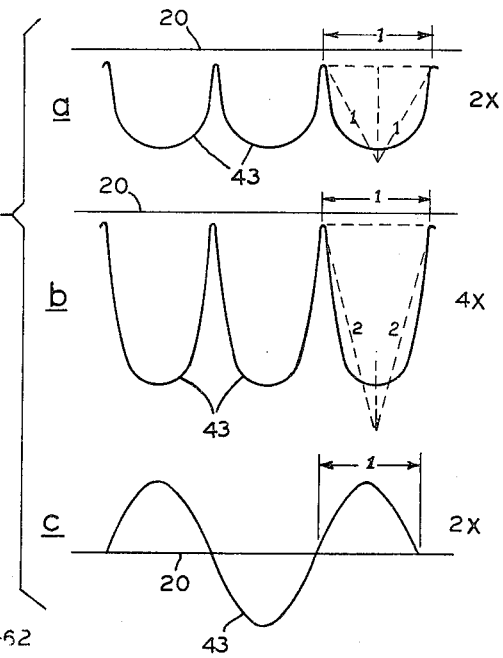
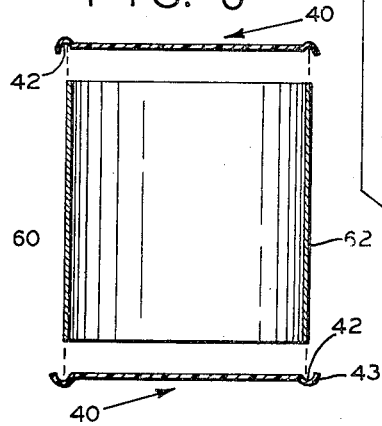
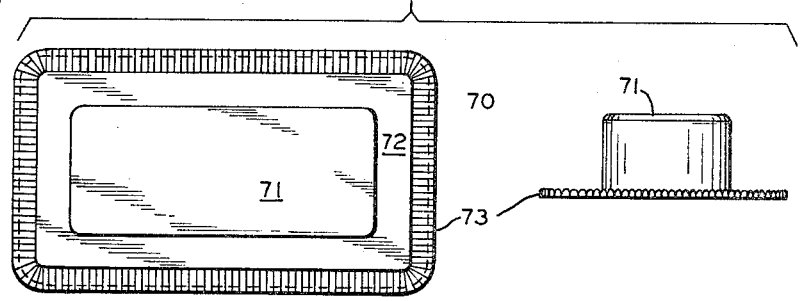
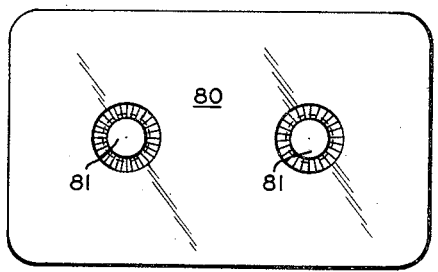
INVENTOR.
CARLTON L. WHITEFORD
BY William S. Henry
ATTORNEY.

United States Patent Office 3,186,576
Patented June 1, 1965

3,186,576
METHOD OF MAKING A DIE CUT EDGE OF THERMOPLASTIC ARTICLES TEAR RESISTANT
Carlton L. Whiteford, New Canaan, Conn., assignor to Poly-Pak Corporation of America, Springdale, Conn., a corporation of Delaware
Filed May 12, 1960, Ser. No. 28,656
3 Claims. (Cl. 229—24)

This invention pertains to a method of orienting thermoplastic materials and more particularly to a method and means of making the die cut edge of orientable thermoplastic articles of manufacture tear resistant by uniaxially orienting the thermoplastic material at or adjacent to its die cut edge.

Uniaxial orienting and/or biaxial orienting of thermoplastics such as polyethylene, polypropylene, polystyrene and other orientable thermoplastic materials are well known. Generally, orientation, according to the prior art teaching, is accomplished by stretching a sheet or tube of thermoplastic material longitudinally and/or laterally at elevated temperatures (generally on the order of 100° C.) at which the material softens and can be stretched with minimal forces and at maximum velocities. Uniaxial orientation refers usually to longitudinally stretching of the material and biaxial orientation refers to both longitudinal and lateral stretching. The improved physical properties of an oriented thermoplastic over the same unoriented thermoplastic are well known, however it is also well known that uniaxially oriented sheet is more readily torn along the axis of orientation than across it. Biaxially oriented sheet, while generally more tear resistant than uniaxially oriented sheet torn along or parallel to its axis of orientation, is less tear resistant than uniaxially oriented sheet torn across or traversely of the axis of orientation. Thus, an article of manufacture made from an oriented or unoriented sheet by any of the well known thermoforming techniques, and separated therefrom by die cutting, will have a relatively weak area along the die cut edge at which the material is likely to or may tear when subjected to forseeable and expected accidental abuse. For example, a uniaxially oriented sheet from which a receptacle or "blister" is formed and then separated from the remaining sheet material will be readily torn along the die cut edge running across the orientation axis. This disadvantage is overcome to a large degree according to the present invention by uniaxially orienting the material at and/or adjacent to the die cut edge, such that the axis of orientation is parallel thereto, about the marginal portion of the article formed.

According to this invention, uniaxial orientation is accomplished by deeply corrugating a strip of the sheet material adjacent to the line where the die cut edge will be. In addition to the foregoing, a serrated or corrugated die cut edge has a much greater degree of expandability or flexibility thereby permitting greater abuse, which together with the above-mentioned orientation cooperates to substantially eliminate tearing into or across a die cut edge.

Therefore a general object of this invention is to provide a tear resistant die cut edge for orientable thermoplastic articles of manufacture.

A more particular object of this invention is to provide a uniaxially oriented die cut edge for a thermoplastic article.

Another object of this invention is to provide a uniaxially oriented, deeply corrugated die cut edge for a thermoplastic article whereby the tear resistance of said die cut edge is materially increased.

A further object of this invention is to provide a method of uniaxially orienting areas or portions of a thermoplastic article to increase its tear resistance at specific areas or zones.

A still further object of this invention is to provide a thermoplastic article of manufacture having a uniaxially oriented die cut edge, or zone adjacent thereto, formed by deeply corrugating the die cut edges or zone so that the axis of orientation is parallel to the die cut.

The above enumerated and additional objects and advantages of the invention will be apparent from the following description of the annexed drawings wherein.

Figure 2:
FIG. 2 shows a cross-sectional view of a disc or partially formed part made according to known thermoforming procedures, such as illustrated in FIG. 1, which has been die cut from the remaining sheet material and is being preheated in an oven or other preheating device.
Figure 3:
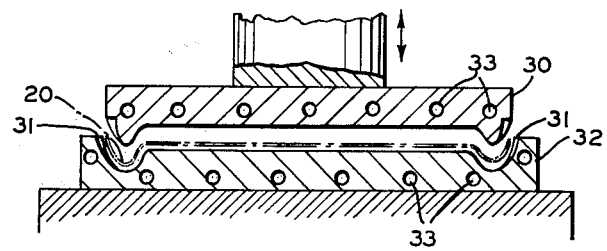
Figure 4:
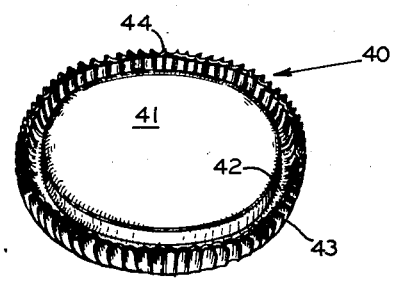

FIG. 3 schematically illustrates the method according to this invention whereby the die cut skirt or flange portion of the disc of FIG. 2 is uniaxially oriented by deeply corrugating the flange or skirt to increase tear resistance and allow for rugged handling;

FIG. 4 is a perspective view of a tear resistant, die cut disc-shaped container closure member for a container as illustrated in FIG. 6, produced by the method of the invention;

FIG. 5 is a detailed, schematic cross-sectional view of corrugated die cut flanges such as shown in FIG. 4 and illustrating the principle of stretching to different degrees, by corrugating to different patterns;

FIG. 6 is a schematic, expanded, cross-sectional view of a container utilizing a disc of the type shown in FIG. 4 as end closure members;

FIG. 7 and FIG. 8 illustrate further applications of the invention.

Figure 1:
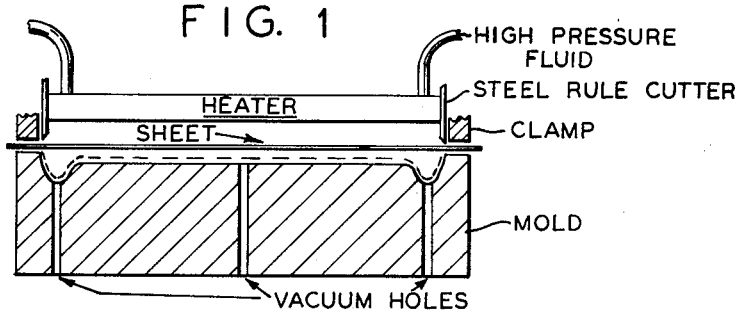
FIG. 1 is a generally schematic, cross-sectional view of apparatus for vacuum forming a disc as shown in FIG. 2.

Referring to the drawings, FIG. 1 diagrammatically illustrates a known pressure vacuum thermoforming technique for fabricating articles such as the generally disc-shaped article 10 shown in FIG. 2 and indicated by the dotted lines of FIG. 1. The sheet stock is clamped to a pre-heating platen and heated for a timed period to bring the sheet to forming temperature. Differential pressure is applied to the sheet to force it to conform to the mold by applying vacuum to the mold side of the sheet and air pressure between the softened sheet and the pre-heating platen. After a timed cooling period, the air and vacuum is shut off, the die cutting effected and the formed article removed from the mold. It will be obvious to those skilled in the art that, in forming the sheet as shown in FIG. 1, or any other sheet forming technique, on a male or female die or mold, the material of disc 10 will be uniaxially oriented and the axis of orientation of the flange 20 will be perpendicular to the die cut 21. Thus, even though the sheet from which the disc 10 is formed was originally biaxially oriented, the conformed sheet will be, to a greater degree depending on the final conformation or depth of draw, uniaxially oriented in the area adjacent the die cut edge. Since the orientation axis of the material of flange 20 of the article is predominantly at right angles or perpendicular to the die cut edge 21, the tear resistance of the flanged edge of the disc of FIG. 2 is greatly reduced.

According to this invention the flange 20 of the disc 10 of FIG. 2 is oriented, or further oriented to make the flange 20 more highly tear resistant. As indicated hereinabove, if the flange 20 is uniaxially oriented, such that the axis of orientation is parallel with the free end or die cut edge thereof, tear resistance is not only enhanced but made superior even to the resulting tear resistance of a biaxially oriented flange.

A disc made according to a thermoforming technique such as illustrated in FIG. 1, is preheated in an oven 12 to a temperature not exceeding the heat distortion temperature range of the material from which the disc is made since it is impractical to clamp the disc to prevent disorientation. Further, higher preheating temperatures are not necessary to orient the flange 20 of disc 10 since the mating dies 30, 32 (FIG. 3) exert a very great pressure on the flange material. Thus, it is possible to orient the flange at room temperatures but the pressures exerted must be applied slowly to prevent rupturing the flange material. As a result the disc 10 is preheated to a temperature 10 to 20 degrees below the heat distortion temperature range to eliminate rupturing the flange and allow the flange to be oriented in a minimum of time.

Heat distortion temperature ranges (HDT) for thermoplastic material are readily available but for convenience a few examples are given in the following table:

| | HDT, °F. |
|---|---|
| Unmodified polystyrene | 150–195. |
| ABS copolymers | 165–225. |
| Unmodified polypropylene | 210–230 (66 p.s.i.). |
| Polyethylene: | |
| High density (0.941–0.965) | 140–180 (66 p.s.i.). |
| Medium density (0.926–0.941) | 120–150 (66 p.s.i.). |
| Low density (0.912–0.925) | 105–121 (66 p.s.i.). |

Any suitable apparatus may be utilized to stretch and orient the flange 20 of disc 10 such that the final corrugated circumferential dimension of the die cut edge is 2 to 4 times (2×–4×) and preferably 3×, its initial circumference as in FIG. 2. As illustrated in FIGS. 3 and 4, the flange 20 is preferably stretched by deeply corrugating it to increase the circumference of the die cut edge 3× measured along the die cut surface or along the free edge of the discrete corrugated surfaces comprising the flange 20 as seen in FIG. 4. As seen in FIG. 3 the preheated disc 10 is placed in a female die 32 which is interiorly peripherally corrugated as at 31. The moveable correspondingly corrugated mating die 30 closes on the disc, deeply corrugating flange 20 whereby the flange 20 is peripherally uniaxially oriented in a direction parallel with the die cut edge of the flange 21. In order to quickly set the corrugated flange the dies 30, 32 are cooled to maintain them at room temperature. For this purpose reference numeral 33 illustrates a cooling channel. The corrugations may be formed to the shapes shown in FIG. 5, or any other suitable undulated configuration.

As noted above, any suitable apparatus and any suitable undulating configuration may be utilized in stretching the thermoplastic material. It should also be noted that it is within the contemplated method of the invention to stretch or orient a zone adjacent to a die cut thermoplastic material, whereby the material is oriented along an axis parallel with the die cut edge, but spaced from the actual die cut edge. However, the presently preferred method of stretching or orienting a die cut edge is to deeply corrugate the die cut material at an elevated temperature or cold stretching at room temperatures.

The flanged disc shown in FIG. 4 generally designated by reference numeral 40 and made according to the above described method, comprises a central circular section (41), a marginal annular channel or recess (42) terminating in an upturned, deeply corrugated die cut flange (43). Due to the degree of stretch imparted to the flange in forming the corrugations, it is oriented predominantly uniaxial or totally uniaxial in planes parallel to the free end or die cut edge 44. Thus, by deeply corrugating the flange it becomes circumferentially uniaxially oriented and also thinner and therefore more flexible.

As seen diagrammatically in FIG. 5, the corrugations are preferably made arcuate to minimize the depth of draw and obtain more accurate conformation since a sharply contoured V-shaped corrugation, as illustrated by the dotted lines, would be difficult if not impossible to attain. To stretch every linear part of the sheet or flange 20 two times (2×) as shown in FIG. 5a, each unit measurement of the sheet or flange 20 is conformed to an arcuate distance measuring 2× its original straight distance measurement. In practice the thickness of the corrugated flange material will be appreciably reduced when stretched as compared to the original material thickness of the uncorrugated flange; however, the corrugated flange 43 will be quite strong and durable due to its orientation and exceedingly flexible due to the corrugated configuration.

As seen in FIG. 5c the corrugation may also be made in a wave form rather than the serrated or coined form as seen in FIGS. 5a and 5b.

As seen in FIG. 6 a disc, best seen in FIG. 4 and made according to the methods described above, is particularly adapted as an end closure member generally designated 40, for a cylindrical container, generally designated 60, for dry powdered substances such as salt and cleansing powder. The discs 40 are cemented to the ends of the cylindrical member 62 which may be made of either thermoplastic or pressed paper, etc. It should be noted that a corrugated flange will not materially affect the bond between the closure member and the cylindrical sidewall member since the press fit between the inner surface of the channel 42 is substantially the same as prior art thermoplastic closure members and the cementing surface is likewise unchanged since the corrugations taper from a minimum depth at the bottom of the channel outwardly to a maximum depth at the die cut edge.

Further applications of the method of the invention are illustrated in FIGS. 7 or 8. FIG. 7 illustrates a so-called "blister pak" 70 which is thermoformed from a thin sheet of transparent thermoplastic material such as polypropylene, biaxial polystyrene and other similar thermoplastics. A plurality of "blisters" are formed in a sheet, according to known practices, and separated therefrom by die cutting to provide a receptacle 71 with a base skirt 72 which is cemented to a paper or plastic backing member (not shown). Thus, to render the base skirt 72 tear resistant according to the invention, the material contiguous to the die cut edge is deeply corrugated, as at 73, such that the orientation is parallel to the die cut edge. As seen in FIG. 8, orientable thermoplastic sheet material 80 may be made tear resistant about a die cut aperture 81 according to the invention by corrugating the material adjacent the aperture such that the axis of orientation is circular and parallel to the die cut edge of the material defining the aperture.

In each of the illustrations given in FIGS. 4, 7 and 8 the corrugations or undulations are formed at the die cut edge. Obviously, it is also possible to attain substantially the same results by orienting or corrugating a narrow zone of the material space a short distance from the die cut edge as illustrated by the broken lines in FIGS. 7 and 8.

While I have shown a preferred method of orienting die cut thermoplastic articles of manufacture and in its broad sense a method of orienting such materials, it will be obvious to those skilled in the art that various modifications may be made in the methods in accordance with known practices without departing from the spirit of the invention. Therefore, the above description is intended to illustrate the method and utility of the invention defined by the appended claims.

I claim:

1. A method of forming apertures in orientable thermoplastic sheet material comprising die cutting said material to form said apertures, deeply corrugating the material adjacent said apertures, said corrugations stretching said die cut edge two to four times its initial circumference whereby said corrugated material is uniaxially oriented parallel to said die cut.

2. An orientable thermoplastic end closure for a cylindrical container comprising a central disc portion, an annular flange portion and an annular channel therebetween defined by said disc portion and said flange portion; said closure characterized by said flange portion having a die cut marginal edge, said flange being deeply corrugated adjacent said die cut edge to uniaxially orient said flange in a direction parallel to said die cut edge.

3. A container having in combination, a cylindrical side wall member, an orientable thermoplastic closure member fixedly secured to each end of said cylindrical member, said combination characterized by said closure members having a corrugated die cut edge whereby said edge material is uniaxially oriented in a plane parallel with said die cut edge.

References Cited by the Examiner

UNITED STATES PATENTS

| | | |
|---|---|---|
| 2,120,328 | 6/38 | Ferngren. |
| 2,240,274 | 4/41 | Wade. |
| 2,285,575 | 6/42 | Elbertz. |
| 2,356,012 | 8/44 | Smith _____ 215—39 |
| 2,913,139 | 11/59 | Freeman _____ 220—60 |
| 2,921,731 | 1/60 | Volckening et al. |

FOREIGN PATENTS

| | | |
|---|---|---|
| 659,382 | 2/29 | France. |

THERON E. CONDON, *Primary Examiner.*

FRANKLIN T. GARRETT, EARLE J. DRUMMOND,
*Examiners.*